July 16, 1935.  P. MUNSON  2,008,332

SHOCK ABSORBING MECHANISM

Filed June 28, 1934  4 Sheets-Sheet 1

Fig. 1.

Inventor

Peder Munson

Geo. P. Kimmel

Attorney

Inventor
Peder Munson
By Geo. P. Kimmel
Attorney

July 16, 1935.  P. MUNSON  2,008,332

SHOCK ABSORBING MECHANISM

Filed June 28, 1934   4 Sheets—Sheet 3

Inventor
*Peder Munson*

By *Geo. P. Kimmel*
Attorney

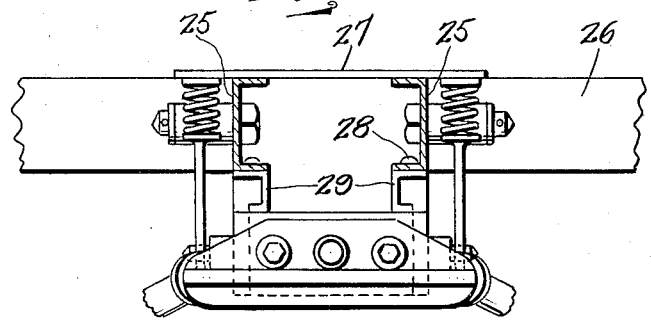
Fig.6.
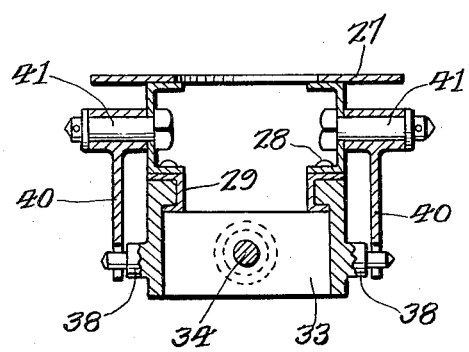
Fig.7.
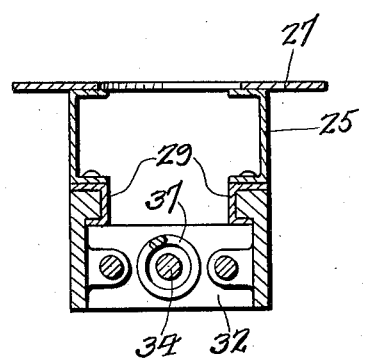
Fig.8.
Fig.9.
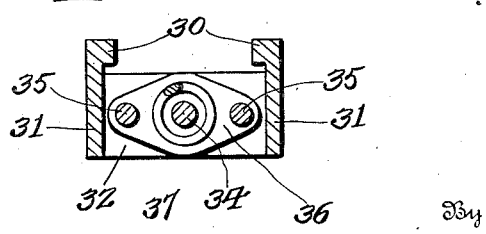
Inventor
Peder Munson
By Geo. P. Kimmel
Attorney Patented July 16, 1935

2,008,332

UNITED STATES PATENT OFFICE 2,008,332

SHOCK ABSORBING MECHANISM

Peder Munson, Philadelphia, Pa.

Application June 28, 1934, Serial No. 732,903

7 Claims. (Cl. 267—67)

In general, my present invention relates to a shock absorbing mechanism effective in connection with the chassis of a vehicle to absorb shocks, especially those directed lengthwise of the chassis, suddenly encountered by the front or rear wheels and axles, and of a nature to which the usual or ordinary vehicle springs cannot properly respond.

It has been proposed, for the above purpose, to employ tension rods extending from the axles, adjacent to their outer ends, to spring devices supported by the frame intermediate its ends, and it is to such an arrangement, and particularly to the frame carried spring or compression device and its association with the frame, that my present invention is directed, with the object in view of maximum flexibility and effectiveness.

According to my invention, the compression device not only combines and controls members which are connected to the tension or connecting rods and are movable against resilient tension, but such device is also bodily shiftable and is resiliently tensioned in its latter movement, in the manner and for the purpose which will be hereinafter made plain.

Figure 2:
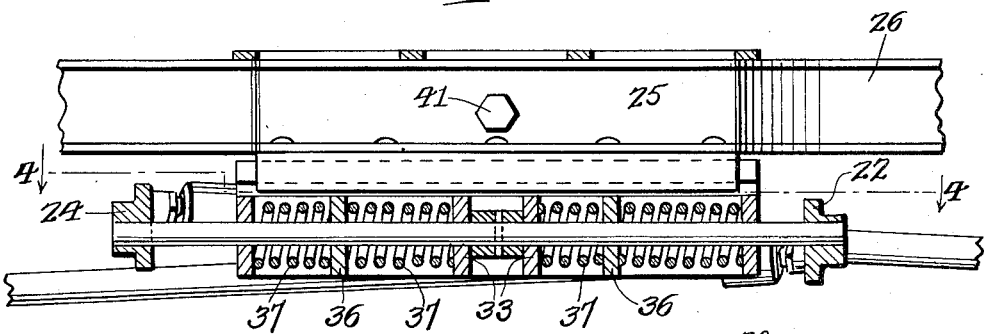
Figure 3:
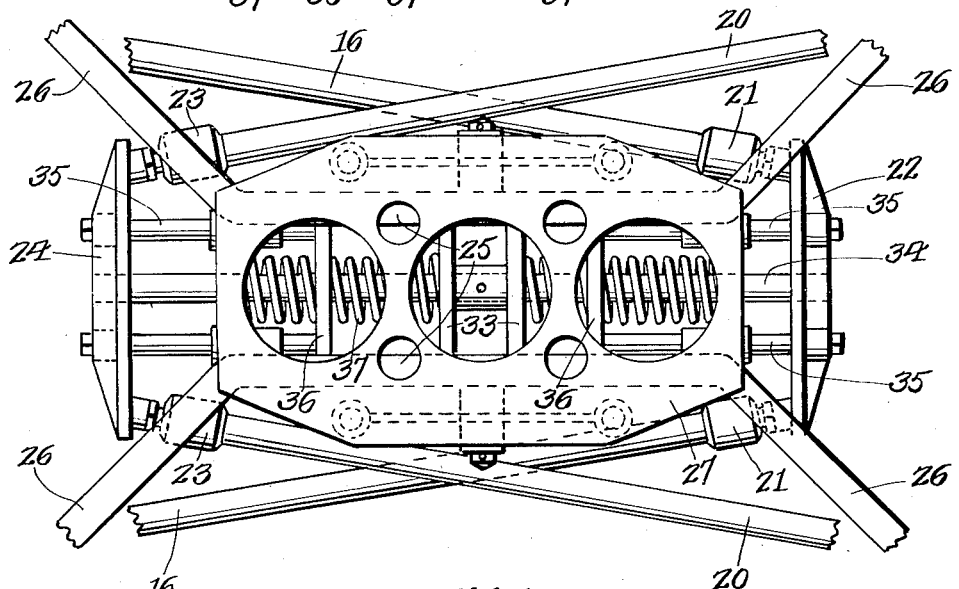
Figure 4:
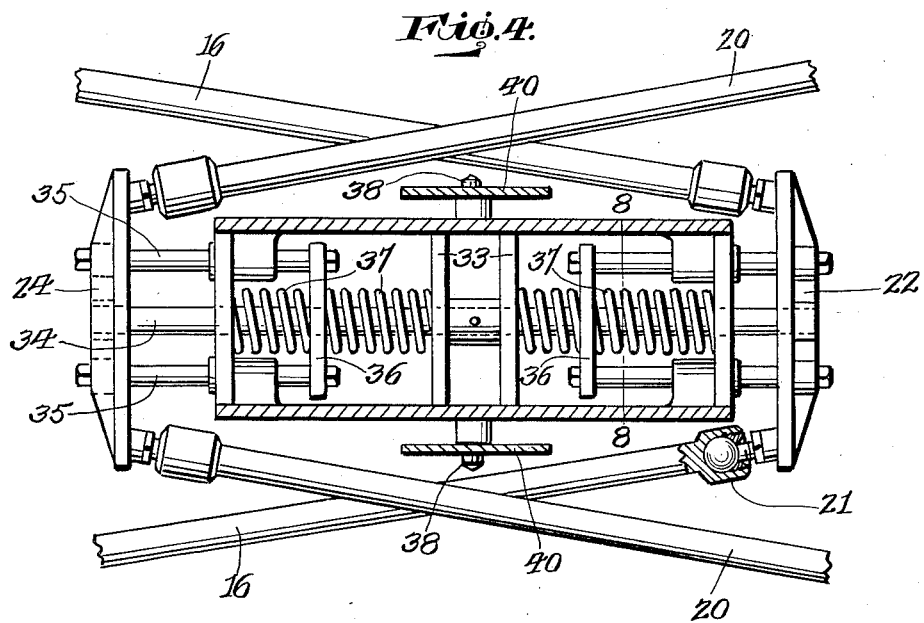
Figure 5:
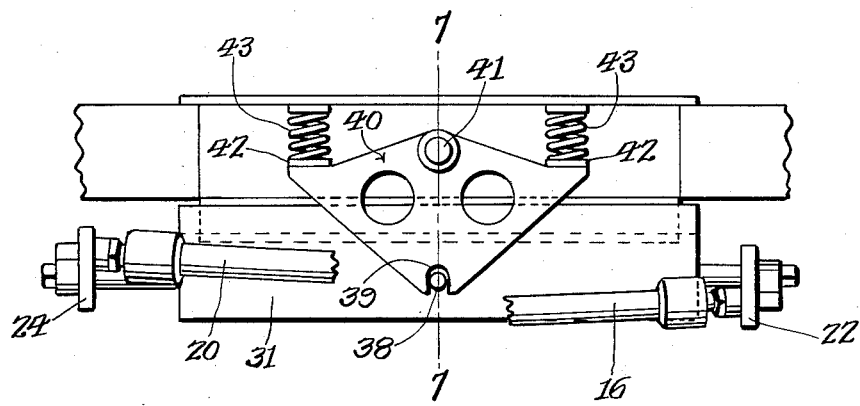

In the accompanying drawings which illustrate my present invention and form a part of this specification, Figure 1 is a top plan view showing a vehicle chassis equipped with my improvements, Figure 2 is a detail vertical longitudinal section on an enlarged scale, taken substantially on line 2—2 of Figure 1, Figure 3 is a detail top plan view of the parts shown in Figure 2, Figure 4 is a horizontal section taken therethrough substantially on line 4—4 of Figure 2, Figure 5 is a side elevation of the parts shown in Figure 2, Figure 6 is an end view thereof, Figure 7 is a detail vertical section taken substantially on line 7—7 of Figure 5, Figure 8 is a similar view through the same parts taken substantially on line 8—8 of Figure 4, and Figure 9 is a detail vertical section taken transversely through the frame of the compression device.

Referring now to these figures and particularly to Figure 1 I have shown therein the chassis of a vehicle in which the frame side bars appear at 10 and the front and rear wheels at 11 and 12, respectively in the usual connection with the front and rear axles 13 and 14.

In connection by means of shackles or other suitable fastening members 15 attached to the end portions of the front axle 13, are the forward ends of a pair of tension or connecting bars 16, whose forward ends are joined to the shackles or attaching members 15 through universal joints 17.

Similarly attached through universal joints 18 and shackles or other suitable attaching members 19 to the opposite end portions of the rear shaft 14, are a pair of similar tension or connection rods 20.

All of the tension and connecting rods 16 and 20 are arranged diagonally with respect to the chassis frame, the forward rods 16 converging towards one another in their rearward extension and the rear rods 20 similarly converging in their forward extension. The rear ends of the forward rods 16 and the forward ends of the rear rods cross one another intermediate the ends of the chassis frame, the rear rods being substantially above the forward rods, and the rear extremities of the forward rod 16 are connected through universal joints 21 with the opposite end portions of a cross head 22. Similarly the forward ends of the rear rods 20 are connected through universal joints 23 to the opposite end portions or a cross head 22.

The spring or compression device as a whole is situated between the cross heads 22 and 24, and for the support thereof, a pair of side bars are provided having inner parallel straight portions 25 longitudinally of the vehicle chassis and spaced upon opposite sides of its longitudinal center. The bars just referred to also include angular end portions 26 divergent from the portions 25, in the direction of, and secured at their outer ends to, the side bars 10 of the chassis.

The supporting bars just referred to, for the support of the compression or spring device, thus form substantially an X-shaped reinforcement for the vehicle chassis, especially in connection with a top or bearing plate 27, in the nature of a gusset, extending over and between the spaced parallel portions 25 of the bars and securely fastened thereto by welding or other means, this plate having its side portions extending outwardly beyond the portions 25 of the supporting bars for a purpose which will be presently made plain.

By referring to Figure 6 it will be noted that the supporting bars are in the nature of channel beams with their channels facing one another and it will be further noted from this figure and from Figures 7 and 8 that there are secured along the lower flanges of these channels, as by means of rivets or like fastening members 28, a pair of spaced parallel rails 29 with their channels facing outwardly to receive the upper inwardly angular portions 30 of the side walls 31 of the spring or compression box, in slidable relation so as to thus permit the box a guided lengthwise shiftable movement longitudinally and centrally of the vehicle chassis.

In addition to its side walls 31, the spring or compression box, is provided with end walls 32 and more or less centrally disposed crossing walls 33 and through bearing apertures in these end walls 32 and crossing walls 33 extends a movable central guide shaft 34 and side shafts 35 through only the end walls and whose outer ends project beyond the end walls and are rigidly secured at their outer extremities to the cross heads 22 and 24. It will be noted from Figure 2 that these connections between the shafts 34 and 35 and the cross heads 22 and 24 are so completed that the cross heads are slightly offset vertically with respect to one another in keeping with the overlapping inner ends of the tension or connecting rods 16 and 20 before referred to.

The several shafts 35 are also rigidly connected at their inner ends to tension plates 36 movable in the spaces between the end walls 32 of the compression box and the crossing walls 33 and engaged by the adjacent ends of companion springs disposed at the opposite sides of these plates with their outer ends abutting the end walls and the crossing walls. These springs, indicated at 37, are coiled around the central guide shaft 34 and thus maintained against displacement.

Centrally of its opposite side walls 31, the spring or compression box is provided with rigid outstanding trunnions 38 which extend into and through the lower recesses 39 of a pair of generally triangular rocking supports 40. These supports 40 are journalled midway of their upper portions upon trunnion bolts 41 rigidly outstanding from midway points of the central parallel portions 25 of the supporting bars and their upper opposite side portions provide seats at 42 for the lower ends of controlling springs 43 extending vertically between these seats 42 and the lower surface of those portions of the bearing plate 27 extending outwardly beyond the parallel portions of the supporting bars as previously referred to.

In this way the spring or compression box as a whole, bodily shiftable longitudinally of the chassis by virtue of its sliding upon the upper rails 29, is tensioned in such movement by the controlling springs 43 serving to resiliently control the rocking plates or bars 40 in their movement.

Obviously such bodily shiftable movement of the spring or compression bars, while a comparatively short one, is sufficient to permit all of the relatively movable parts to adapt themselves to such further movements as are required of them in the absorption of shocks, wherein the tension plates 36 are shifted against the resilient support of the spring 37.

It is to be understood that in disclosing coiled metal springs as the medium by which movements of the parts to be controlled are yieldingly resisted, I desire to be understood as comprehending and covering such well known equivalents as rubber and air, oil and other suitable gases and fluids.

It is also to be understood that while my present improvements are, as before stated, primarily directed to the central compression box and its immediately adjacent parts, use of my invention is contemplated with vehicle connections including sliding spring shackles all around and a universally jointed sectional steering column as in my application filed September 26, 1933, under Serial Number 690,992.

What I claim is:—

1. A shock absorbing mechanism for the chassis of a vehicle including a frame and front and rear wheels, said mechanism comprising a compression device intermediate the ends of the frame, having therein members movable under yielding resistance, connecting rods between said members and the axles of the chassis, and frame carried means with which the said compression device has a yieldingly resisted movement lengthwise of the frame.

2. In a shock absorbing mechanism for a vehicle chassis including connecting bars in connection at their outer ends with the axles of the chassis, a compression device supported by the frame of the chassis, having members movable under yielding resistance to which the inner ends of said rods are connected, said device being bodily shiftable lengthwise of the chassis frame, and spring members yieldingly resisting the compression device in its bodily shifting movements.

3. In a shock absorbing mechanism for the chassis of the vehicle including a frame carried spring device and connecting rods between the said spring device and the axles of the chassis, said spring device including resiliently resisted members to which the connection rods are joined, and a support for the said device including a trackway slidably engaged by the said device, and spring supported rockers also engaged by said device is yieldingly resist the same in its sliding movements.

4. In a shock absorbing mechanism for the chassis of a vehicle including inwardly converging connecting rods joined at their outer ends to the axles of the chassis, supports intermediate the ends of the frame of the chassis, having trackways, a spring box slidable in said trackways and having laterally projecting trunnions, spring resisted members supported for limited rocking movement at the sides of the spring box and engaged by the trunnions of the latter to yieldingly resist sliding movements of the spring box and resiliently supported members in the spring box having connection with the inner ends of the said connecting rods as described.

5. In a shock absorbing mechanism for the chassis of a vehicle, which includes a spring device resiliently supporting the inner ends of connecting rods joined at their outer ends to the axles of the chassis, said spring device including a frame, the side portions of which have angular upper extensions, a pair of guide rails supported by the frame and slidably engaged by the said extensions of the frame, a pair of rocker members journalled intermediate their upper portions, at opposite sides of the spring device, springs engaging the opposite ends of said rocking members to yieldingly resist their rocking movements, and connections between said frame and the said rocking members including recesses in the lower portions of the latter and trunnions outstanding from the said frame and extending into said recesses.

6. In a shock absorbing mechanism for a vehicle chassis, connecting bars in connection at their outer ends with the axles of the chassis, a compression device supported by the frame of the chassis and having movable, yieldingly resisted members therein connected to the inner ends of said rods, said compression device being bodily shiftable lengthwise of the chassis frame, and means for yieldingly resisting the shifting movements of the compression device.

7. In a shock absorbing mechanism for the chassis of the vehicle, including a compression device carried by the chassis frame and connecting rods between said device and the axles of the chassis, said compression device including movable, yieldingly resisted members to which said rods are joined, a frame-carried trackway in which said device is slidable, and means in connection with the compression device and with the chassis frame for yieldingly resisting the device in its sliding movements.

PEDER MUNSON.